(12) United States Patent
Suffredini et al.

(10) Patent No.: US 6,488,012 B1
(45) Date of Patent: Dec. 3, 2002

(54) METHOD AND APPARATUS FOR DETERMINING FUEL PRESSURE

(75) Inventors: Giuseppe Domenico Suffredini, Shelby Township, MI (US); Mark Thomas Linenberg, Dearborn, MI (US); Ralph Wayne Cunningham, Milan, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/649,929

(22) Filed: Aug. 29, 2000

(51) Int. Cl.$^7$ .............................................. F02M 37/08
(52) U.S. Cl. ........................ 123/458; 123/357; 123/497
(58) Field of Search .................................. 123/446, 456, 123/458, 497, 478, 512, 357, 511

(56) References Cited

U.S. PATENT DOCUMENTS

| | | | | |
|---|---|---|---|---|
| 4,791,905 A | * | 12/1988 | Furuta et al. ................ 123/497 |
| 5,479,909 A | * | 1/1996 | Blakeslee et al. ............ 123/491 |
| 5,495,841 A | * | 3/1996 | Gillbrand et al. ............ 123/480 |
| 5,560,340 A | * | 10/1996 | Tomisawa .................... 123/494 |
| 5,715,797 A | * | 2/1998 | Minagawa et al. .......... 123/497 |
| 5,819,196 A | * | 10/1998 | Holmes et al. .............. 701/103 |
| 5,819,709 A | * | 10/1998 | Holmes et al. .............. 123/497 |
| 5,842,454 A | * | 12/1998 | Miwa et al. ................. 123/497 |
| 5,850,818 A | * | 12/1998 | Yoshiume et al. ....... 123/198 D |
| 6,016,791 A | * | 1/2000 | Thomas et al. .............. 123/497 |
| 6,102,009 A | * | 8/2000 | Nishiyama ................... 123/456 |
| 6,192,863 B1 | * | 2/2001 | Takase ......................... 123/357 |
| 6,223,731 B1 | * | 5/2001 | Yoshiume et al. ........... 123/497 |
| 6,240,902 B1 | * | 6/2001 | Tanaka et al. ............... 123/463 |
| 6,431,838 B2 | * | 8/2002 | Tanaka et al. ............... 123/456 |
| 6,453,878 | * | 9/2002 | Mazet .......................... 123/497 |

* cited by examiner

Primary Examiner—Tony M. Argenbright
Assistant Examiner—Hai H Huynh
(74) Attorney, Agent, or Firm—Chupa & Alberti PC

(57) ABSTRACT

A method and an apparatus 34 for inferring the amount of pressure resident within a fuel delivery member 8 by measuring the voltage delivered to a pump 24 and by calculating a desired fuel flow rate.

10 Claims, 2 Drawing Sheets

METHOD AND APPARATUS FOR DETERMINING FUEL PRESSURE

FIELD OF THE INVENTION

The present invention generally relates to a method and an apparatus for determining fuel pressure and more particularly, to a method and an apparatus for determining the amount of pressure resident within a fuel rail member without the use of a pressure sensor, effective to determine the length of time necessary to activate at least one fuel injector, thereby allowing an engine to operate in a desirable and efficient manner.

BACKGROUND OF THE INVENTION

Vehicles typically include an internal combustion engine having at least one (normally several) selectively activated fuel injectors which are adapted to receive fuel and to inject the received fuel into piston-containing cylinders, effective to allow the fuel to be combusted in the cylinders and to cause the movably contained pistons to be moved in a desired and torque-producing manner. In order to allow the engine to operate in a desired and efficient manner and in order to reduce the emission of undesired constituents which are formed by the combustion of the fuel, it is desirable to regulate the amount of fuel which is injected into the cylinders. This regulation is normally achieved by regulating or controlling the amount of time during which the injectors are "activated" (e.g., are injecting fuel into the cylinders) according to one of several methodologies.

Each of these methodologies requires the use of a quantity which is equal to the amount of fuel pressure which is resident within a fuel delivery member or assembly (e.g., a "fuel rail" member or assembly) which is physically coupled to a source of fuel and to the injectors and which selectively communicates the fuel to the injectors. More specifically, this pressure quantity is typically provided by a fuel pressure sensor which is resident within the fuel delivery member.

While a fuel pressure sensor does provide the needed pressure measurement or quantity, it suffers from some drawbacks. For example, the sensor is relatively expensive and may require maintenance or replacement, thereby increasing the overall cost of operating and servicing a vehicle.

There is therefore a need for a method and an apparatus for determining the amount of fuel pressure existing within a fuel delivery member in a manner which overcomes some or all of the previously delineated drawbacks of prior methods and apparatuses.

SUMMARY OF THE INVENTION

It is a first object of the present invention to provide a method and an apparatus for determining the amount of fuel existing within a fuel delivery member in a manner which overcomes some or all of the previously delineated drawbacks of prior methods and apparatuses.

It is a second object of the present invention to provide a method and an apparatus for determining the amount of fuel existing within a fuel delivery member in a manner which overcomes some or all of the previously delineated drawbacks of prior methods and apparatuses and which obviates the need for a pressure sensor or transducer.

It is a third object of the present invention to provide a method and an apparatus for determining the amount of fuel existing within a fuel delivery member in a manner which overcomes some or all of the previously delineated drawbacks of prior methods and apparatuses and which may be used to determine a desired amount of time for which at least one fuel injector is to be selectively activated.

According to a first aspect of the present invention, an apparatus for inferring an amount of pressure within a fuel rail and for using the inferred amount of pressure to control a fuel injector is provided.

According to a second aspect of the present invention, an assembly is provided. The assembly comprises a plurality of fuel injectors; a source of fuel; a first member which is coupled to the source of fuel and to the plurality of fuel injectors; a second member which is coupled to a source of voltage which provides a certain amount of voltage to the source of fuel and to the first member and which causes at least some of the fuel which is resident within the source of fuel to be communicated to the first member, thereby creating a certain pressure within the first member; and a controller assembly which is coupled to the second member and to the plurality of fuel injectors, which determines a desired amount of fuel required for each of the plurality of fuel injectors, which senses a certain speed, which determines a certain number of the plurality of fuel injectors which are to be activated during a certain interval of time, which calculates a desired fuel rate, and which uses the desired fuel rate and the certain amount of voltage to infer the amount of the pressure which is resident within the first member.

According to a third aspect of the present invention, a method is provided. The method deduces an amount of pressure resident within a fuel delivery member and includes the steps of calculating a desired fuel rate; determining a certain voltage; and using the desired fuel flow rate and the certain voltage to deduce the amount of the pressure.

These and other aspects, features, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
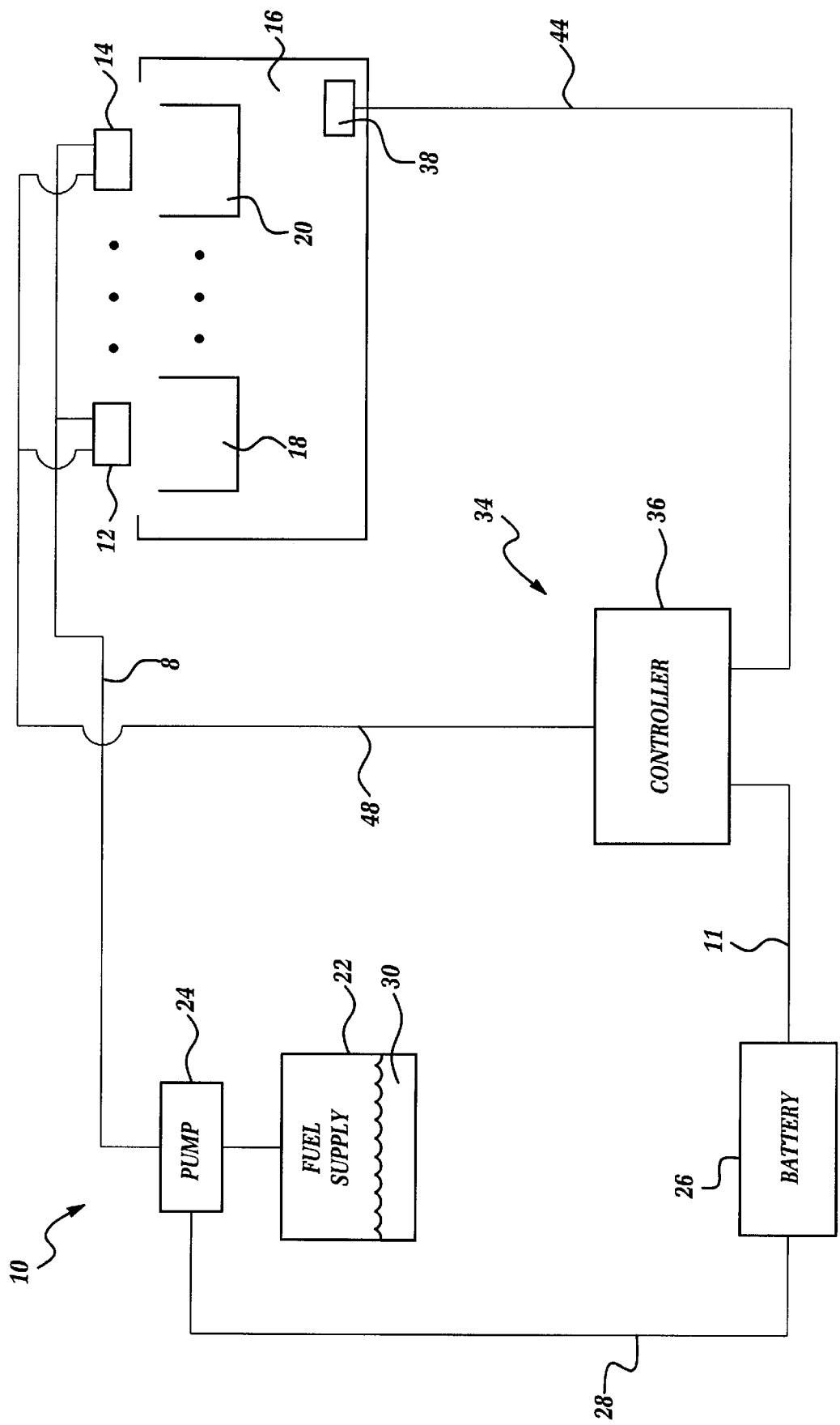
FIG. 1 is operational block diagram of a fuel assembly which utilizes the principles of the preferred embodiment of the invention and which is operatively coupled to and/or which comprises an engine assembly.

Referring now to FIG. 1, there is shown a fuel assembly 10 which is made in accordance with the teachings of the preferred embodiment of the invention. Particularly, fuel assembly 10 includes several fuel injectors 12, 14 which are adapted to be deployed within an engine 16. Engine 16 and fuel assembly 10 may cooperatively form an engine assembly. Specifically, engine 16 includes several piston-containing cylinders 18, 20 and each cylinder 18, 20 respectively and operatively receives fuel from injectors 12, 14 and combusts the received fuel, effective to move the respectively and movably contained pistons (not shown), thereby producing torque.

Fuel assembly 10 further includes a source of fuel 22, a pump 24, a source of electrical energy, such as a battery 26, and a fuel delivery member or "fuel rail" member 8. Particularly, member 8 is physically and operatively coupled to each of the fuel injectors 12, 14 and to the pump 24. Moreover, the pump 24 is operatively and physically coupled to the fuel supply 22 and selectively coupled to the battery or source of energy 26 by use of bus 28. Controller 36 is electrically coupled to the battery 26 by bus 11.

In operation, the pump 24 is activated upon receipt of energy from the battery 26 and causes at least a portion of the fuel 30, contained within supply 22, to be communicated to the member 8 and delivered to the injectors 12, 14 for selective emission into the cylinders 18, 20. In the preferred embodiment of the invention, this injection is performed in a desired and stochiometric manner without the use of a pressure sensor, as is more fully delineated below.

That is, fuel assembly 10 includes an injector control assembly 34 which is made in accordance with the teachings of the preferred embodiment of the invention. As shown, assembly 34 includes a controller 36 which is operable under stored program control, a engine speed sensor 38 which is adapted to determine the current operating speed of the engine 16 and to provide an output signal which is representative of the sensed speed. Controller 36, by use of bus 11, is adapted to determine or measure the amount of voltage or energy which is provided to the pump 24 by the battery or energy source 26. As further shown, controller 36 is physically and communicatively coupled to the speed sensor 38 by use of bus 44 and is adapted, by use of bus 44, to receive the engine speed output signal which emanates from the sensor 38. Controller 36 is further physically, communicatively, and controllably coupled to the injectors 12, 14, respectively, by use of the bus 48 and controller 36 is adapted, by the use of bus 48, to selectively control the amount of time or the interval(s) of time during which each of the injectors 12, 14 are respectively activated (e.g., are respectively delivering fuel to the cylinders 18, 20).

Figure 2:
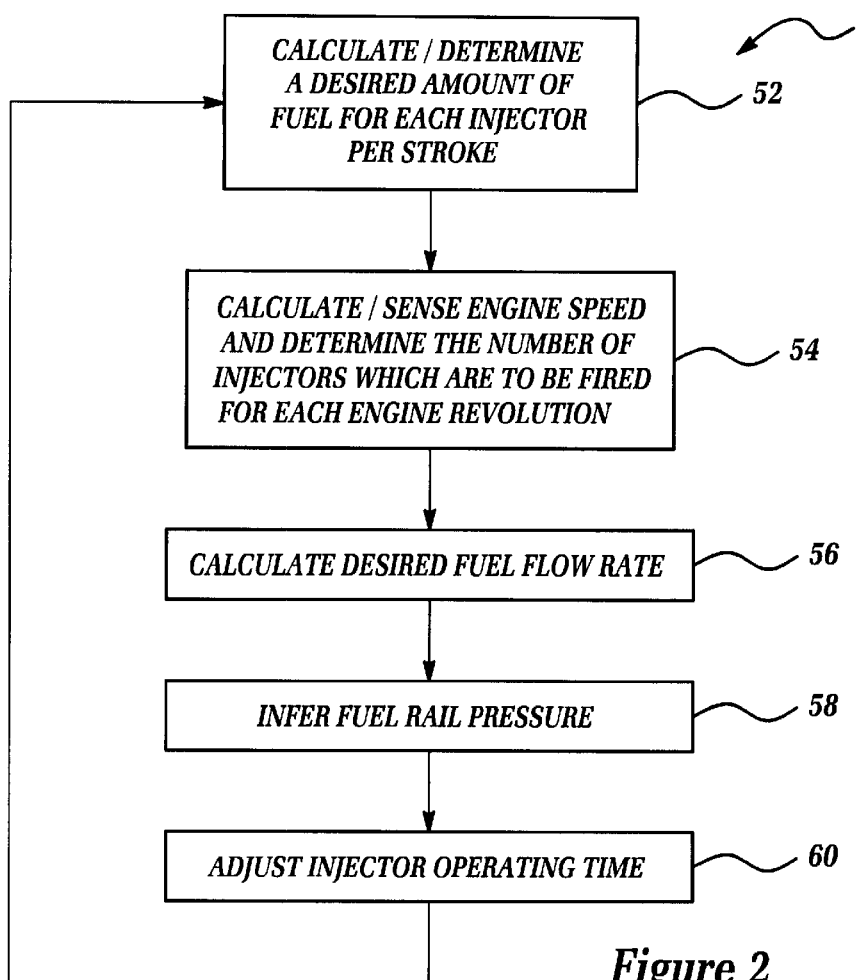
FIG. 2 is a flow chart illustrating the operation of the fuel assembly which is shown in FIG. 1.

To better understand the operation of the assembly 34, reference is now made to flowchart 50 of FIG. 2 which illustrates the operation of controller 36. Particularly, controller 36 performs a first step 52 which requires the controller 36 to calculate the amount of fuel which must be supplied by each of the injectors 12, 14 for each stroke of the engine 16. In one non-limiting embodiment, this calculation and/or determination may be achieved by the use of a known "foreground fuel calculation method". Step 54 follows step 52 and, in this step 54, controller 36 receives the engine speed signal which emanates from the sensor 38 and determines the number of injectors 12, 14 which are to be "fired" or activated for each revolution of the engine 16. Such a determination may be made by the producer or manufacturer of the engine 16 and stored within the controller 36.

Step 56 follows step 54 and, in this step 56, controller 36 uses the information which was obtained in the previous steps 52 and 54 to calculate a desired fuel flow rate. In one non-limiting embodiment of the invention, the desired fuel flow rate may be calculated by multiplying the desired amount of fuel for each engine stroke by the sensed engine speed and the number of injectors which are to be activated for each revolution of the engine 16.

Step 58 follows step 56 and, in this step 58, controller 36 determines, deduces, and/or infers the amount of fuel pressure which is resident within the fuel delivery member 8 without the use of a fuel pressure sensor. Step 60 follows step 58 and, in this step 60, controller 36 utilizes the inferred pressure and the desired fuel flow rate to calculate a desired activation time period or interval for each of the fuel injectors 12, 14. In one non-limiting embodiment of the invention, the actual activation time period or interval for each of the injector 12, 14 is calculated based on the difference of the inferred fuel pressure from a "standard" pressure value according to a known Beroulli relationship, in order to correctly obtain the desired fuel mass in each of the respective cylinders 18, 20 thereby allowing a desired amount of fuel 30 to be delivered to each cylinder 18, 20.

Figure 3:
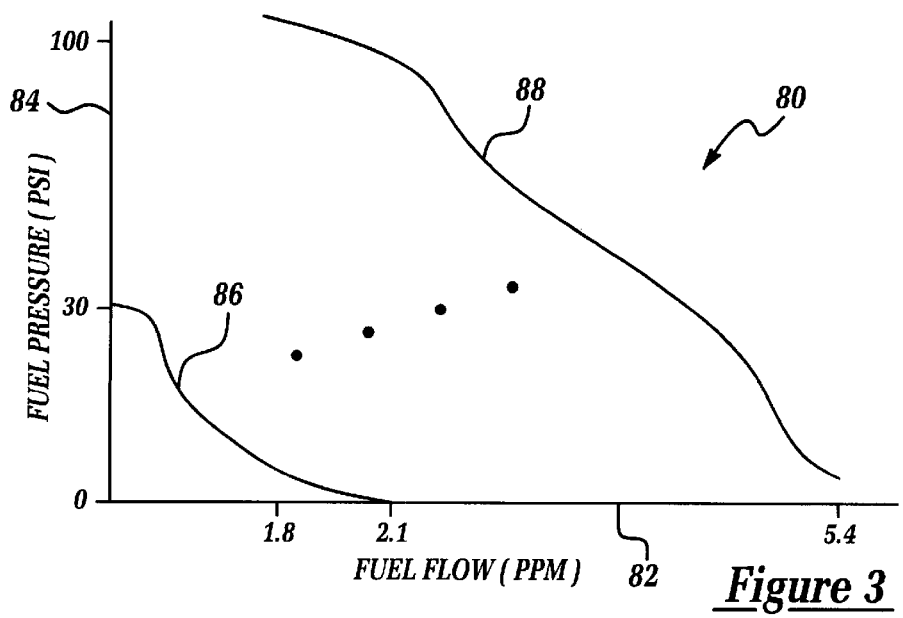
FIG. 3 is a graph illustrating certain operational attributes of the fuel pump which is shown in FIG. 1.

To understand the manner in which the fuel pressure is inferred, reference is now made to the graph 80 of FIG. 3. As shown, a plot or graph may be made of the fuel flow attribute 82 of the pump 24 and the fuel pressure attribute 84 of the delivery member 8, and values of these attributes cooperatively form a relationship (e.g. separate pairs of values for the fuel flow and fuel pressure attributes) for each operating voltage attribute of battery 26, and for each operating voltage, these pairs of values may form a graphical segment or line, such as segment or lines 86, 88. Such information may be empirically derived for each fuel delivery system 10 or obtained from testing, and may reside within controller 36. For example, graphical line or relationship 86 illustrates a variance from about 0 to about 30 pounds per square inch of pressure ("psi") and a variance from about 0 to about 2.1 pounds per minute of fuel flow ("ppm") for a voltage of about 6 volts, while graphical line or relationship 88 illustrates a variance from about 0 to about 100 psi and from about 1.8 to about 5.4 ppm for a voltage of about 13.2 volts. This information therefore obviates the need for a pressure sensor since the voltage is measured by controller 36 and since the flow rate is determined in step 56, thereby allowing controller 36 access to two variables of the foregoing three variable relationship (e.g. the relationship between voltage, flow rate, and pressure which is shown by way of example within graph 80). Here, the stored information, shown in graph 80, is used by controller 36 along with the measured voltage and calculated fuel flow rate to determine the pressure resident within the fuel delivery member 8 by the mathematical principle of interpolation.

It is to be understood that the invention is not limited to the exact construction or method which has been illustrated and described above, but that various changes and modifications may be made without departing from the spirit and the scope of the inventions as are further delineated in the following claims.

What is claimed is:

1. An assembly comprising:

a plurality of fuel injectors;

a source of fuel;

a first member which is coupled to said source of fuel and to said plurality of fuel injectors;

a second member which is coupled to a source of voltage, said source of voltage providing a certain amount of voltage, said second member being further coupled to said source of fuel and to said first member, and said second member causing at least some of fuel which is resident within said source of fuel to be communicated to said first member, thereby creating a certain pressure within said first member; and a controller which is coupled to said second member and to said plurality of said fuel injectors, said controller storing a plurality of fuel pressure to fuel flow rate relationships over a range of voltages, wherein said controller measures said certain amount of voltage and calculates a desired fuel flow rate and is effective to infer said certain pressure within said first member using only a unique one of said plurality of relationships which corresponds to said certain amount of voltage;

wherein said controller uses said inferred certain pressure to adjust an activation time interval for said plurality of fuel injectors.

2. The assembly of claim 1 wherein said first member comprises a fuel rail.

3. The assembly of claim 2 wherein said second member comprises a pump.

4. The assembly of claim 3 wherein said certain speed comprises engine speed.

5. A method for altering an activation time interval of at least one fuel injector by determining an amount of pressure resident within a fuel rail member, said method comprising the steps of:

providing a controller;

calculating a desired fuel flow rate;

storing a plurality of fuel pressure to fuel flow rate relationships determined over a range of fuel pump voltages within said controller;

measuring a certain fuel pump voltage;

using only said desired fuel flow rate and said certain voltage to determine said amount of pressure; and using said determined amount of pressure to only alter said activation time interval for said at least one fuel injector.

6. The method of claim 5 further comprising the steps of:

providing a pump;

coupling said pump to said rail member;

providing a source of fuel;

providing a source of voltage; and coupling said source of fuel and said source of voltage to said pump.

7. The method of claim 6 wherein said source of voltage comprises a battery.

8. The method of claim 7 further comprising the steps of:

measuring a speed of an engine; and using said measured speed to calculate said fuel flow rate.

9. The method of claim 8 further comprising the steps of:

determining an amount of fuel required for a single stroke of an engine; and using said amount of fuel to calculate said fuel flow rate.

10. The method of claim 9 further comprising the steps of:

determining a number of said at least one fuel injectors; and using said determined number of injectors to calculate said fuel flow rate.

* * * * *